United States Patent [19]
Hart

[11] Patent Number: 6,132,626
[45] Date of Patent: *Oct. 17, 2000

[54] LIQUID FILTER

[75] Inventor: John Michael Hart, Cumbria, United Kingdom

[73] Assignee: Maguire Boss, Cambridge, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 09/029,404
[22] PCT Filed: Aug. 16, 1996
[86] PCT No.: PCT/GB96/01994
§ 371 Date: Feb. 19, 1998
§ 102(e) Date: Feb. 19, 1998
[87] PCT Pub. No.: WO97/06872
PCT Pub. Date: Feb. 27, 1997

[30] Foreign Application Priority Data

Aug. 19, 1995 [GB] United Kingdom .................. 9517013

[51] Int. Cl.[7] ............................ B01D 29/62; B01D 35/02
[52] U.S. Cl. ...................... 210/741; 210/744; 210/108; 210/125; 210/128; 210/129; 210/791; 210/793; 210/411; 210/162
[58] Field of Search ..................................... 210/741, 744, 210/108, 106, 411, 791, 793, 125, 126, 129, 128, 162

[56] References Cited

U.S. PATENT DOCUMENTS

| | | |
|---|---|---|
| 3,298,523 | 1/1967 | Johnson . |
| 3,534,855 | 10/1970 | Guillerd . |
| 3,820,658 | 6/1974 | Cruze, Jr. . |
| 3,841,485 | 10/1974 | Malkin . |
| 3,948,773 | 4/1976 | Tucker . |
| 4,055,500 | 10/1977 | Parker . |

FOREIGN PATENT DOCUMENTS

| | | |
|---|---|---|
| 2213444 | 10/1973 | Germany . |
| 8107036 | 9/1982 | Germany . |
| 7821542 | 12/1982 | Germany . |
| 62237916 | 10/1987 | Japan . |
| 8194604 | 3/1981 | United Kingdom . |

*Primary Examiner*—Thomas M. Lithgow
*Attorney, Agent, or Firm*—Wall Marjama Bilinski & Burr

[57] ABSTRACT

A filtration unit is provided with a self-cleaning mechanism which backflushes a screening element therein when it becomes blinded by solid material. A reservoir enables a head of screened liquid to be built up above the screening element. Upon blinding of the screening element, a subsequent rise in the pressure at the inlet of the filtration unit is detected by way of a rising fluid level in a vertically extending chamber. The above causes the opening of a discharge valve which enables a discharge flow to rapidly empty the reservoir through the screening element in a reverse direction, thereby clearing the screen. The clearing operation is carried out entirely hydraulically by the action of the screened fluid and thus no brushes, rakes or scraping devices are required.

15 Claims, 5 Drawing Sheets

LIQUID FILTER

FIELD OF THE INVENTION

The present invention relates to filter means incorporating solid/Liquid filtering screens such as those used in the filtration of sewage, and in particular to units incorporating a self-cleaning action to the filtering screens.

BACKGROUND OF THE INVENTION

In general, existing methods of screening liquids which carry solids in suspension attempt to remove some or all of those solids using fixed or reciprocating, perforated or bars screens situated within the liquid flow. These screens must be routinely cleared to remove the build-up of solid material or screenings from the face of the screen in order to maintain adequate flow of liquid through the screen.

Typically, this clearing operation is carried out by one or more of a number of known mechanical methods, such as the action of rakes, scrapers or brushes on the screen. These methods necessarily require expensive equipment such as motors, gearing and drive systems as well as brushes or scrapers which require regular servicing and/or replacement, with consequent implications for the cost and reliability of the operation of such systems.

Such equipment also invariably consumes substantial quantities of electrical power. Not only is this expensive, but the times when frequent blockage of sewerage systems is most likely, e.g. during storms, can also be the times when the electricity supplies are most vulnerable to interruption. In any event, there are particular problems associated with screening to remove solids and floatables from systems which handle both rainwater and sewage. During heavy rainfall, the collected rainwater flow can easily be one or two orders of magnitude greater than the sewage flow which can result in the system exceeding its capacity and overflowing.

SUMMARY OF THE INVENTION

It is an object of the present invention to provide a liquid/solid filter unit which incorporates a self-cleaning screen. It is a further object of the present invention to provide such a filter unit which requires little or no electrical power to perform the self cleaning action. It is yet another object of the present invention to provide a filtration unit for a rainwater and sewage system which filters additional fluid in the system resulting from heavy rainfall.

To achieve these and other objects, the filter unit of the present invention uses the hydraulic power of the liquid being screened in order to remove screenings from the face of a screening element.

In accordance with a first aspect of the present invention there is provided filter means comprising an inlet, an outlet, and a filter disposed between the inlet and the outlet to filter fluid flowing from the inlet to the outlet, characterised by means for accumulating a head of filtered fluid between the filter and the outlet and means for reversing fluid flow to pass the head of filtered fluid through the filter.

Initially, the pressure of fluid on the inlet and outlet sides of the filter will be substantially equal. However, as the inlet side of the filter becomes blocked with filtrate, a pressure differential will develop as a back pressure on the inlet side builds up. By temporarily reversing the direction of fluid flow the head of filtered fluid passes through the filter dislodging filtrate which has accumulated on the inlet side of the filter without giving rise to any build up of solid on the outlet side. Once the filtrate has been dislodged, the filtering operation may be resumed.

Preferably, the means for reversing fluid flow comprises an additional outlet, disposed on the same side of the filter as the inlet and having means such as a valve for regulating fluid flow through the additional outlet. In one embodiment, the fluid flow through the additional outlet is increased by the valve when the pressure of fluid between the inlet and the filter exceeds a predetermined level. In another embodiment, the valve prevents fluid flowing through the additional outlet when the pressure of fluid between the inlet and filter is at or below the predetermined level.

In a preferred arrangement, the filter means further comprises means, responsive to a change in the pressure of fluid between the inlet and the filter, for controlling the valve. The controlling means may comprise a chamber in fluid communication with the inlet, the level of fluid in the chamber being indicative of the pressure of fluid on the inlet side of the filter. In an especially preferred form, the controlling means further comprises a float in the chamber, the position of the float in the chamber depending on the level of fluid therein. The buoyancy of the float may be used to actuate the valve, preferably via a lever arrangement.

In accordance with another aspect, the present invention provides a filter means comprising an inlet, a first outlet, a second outlet, a filter screen disposed between the inlet and the first outlet, means for accumulating a head of fluid between the screen and the first outlet, and means for discharging the head of fluid through the filter screen to the second outlet when the fluid pressure between the inlet and the screen rises above a predetermined level.

In accordance with a further aspect, the present invention provides a method of cleaning solids from a filter disposed between an inlet and an outlet in a fluid/solid separator, comprising:

storing a head of fluid on the outlet side of the filter, and reversing the direction of fluid flow to pass the head of fluid through the filter from the outlet side to the inlet side.

The head of fluid may comprise fluid filtered by the filter. Preferably, the direction of fluid flow through the filter is controlled by regulating fluid flow through an additional outlet which is provided on the inlet side of the filter. In this way, the solid or filtrate dislodged from the filter can be conveyed to a separate unit for further processing.

In one embodiment, the method further comprises monitoring fluid pressure on the inlet side of the filter and regulating fluid flow through the additional outlet in dependence on the fluid pressure monitored. Preferably, the fluid pressure is monitored by providing a chamber in fluid communication with the inlet, with the level of fluid in the chamber being indicative of the fluid pressure, and determining the level of fluid in the chamber. In this way, the filter is flushed clean only when necessary since a rise in inlet pressure is indicative of increased filter blockage.

In accordance with a still further aspect, the present invention provides a method of clearing a filter screen disposed between an inlet and a first outlet of a filter unit, comprising the steps of: accumulating a head of fluid between the screen and the first outlet; detecting a rise in inlet fluid pressure indicating that the screen has become blinded with solid matter; discharging the head of fluid through the screen to a second outlet on the same side of the screen as the inlet when the inlet fluid pressure between the inlet and the screen rises above a predetermined level.

BRIEF DESCRIPTION OF DRAWINGS

Embodiments of the present invention will now be described by way of example and with reference to the accompanying drawings in which.

DETAILED DESCRIPTION OF THE INVENTION

Figure 1:
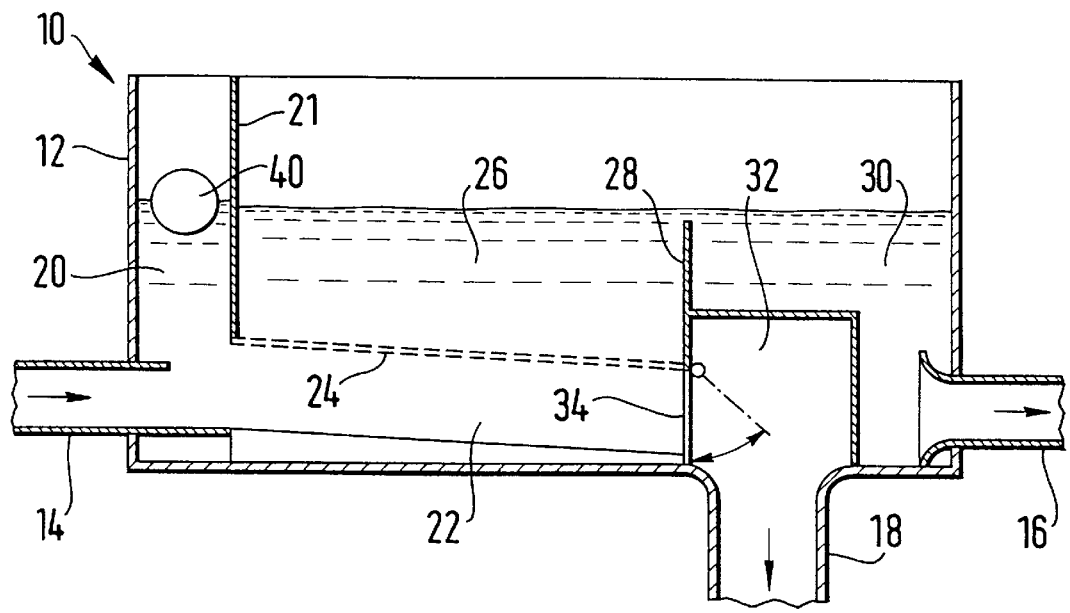
FIG. 1 shows a schematic view of a longitudinal section of a filtration unit according to the present invention.

With reference To FIG. 1 there is shown a side view of a longitudinal cross section of a filtration unit 10 according to the present invention. The filtration unit comprises a housing 12 which provides an inlet 14, a first outlet 16, and a second outlet 18. Inlet 14 enables access of fluid to a vertically extending chamber 20 and an adjacent lower chamber 22. A screening element or filter 24, which preferably lies on a horizontal or slightly inclined plane as shown, separates the lower chamber from a reservoir 26. Reservoir 26 is separated from the vertically extending chamber 20 above the level of screening element 24 by chamber wall 21. Fluid in vertically extending chamber 20 and reservoir 26 may therefore find different levels depending upon a pressure differential formed across screening element 24. Reservoir 26 includes a weir plate 28 over which fluid in reservoir 26 may flow into a first outlet chamber 30 before reaching the first outlet 16.

A second outlet chamber 32, leading to the second outlet 18, is provided on the downstream side of a valve 34, which is preferably a flap-type valve.

The screening element 24 is sized such that it can separate a desired percentage of screenings by application of well established calculations for determination of a required open area and perforation size in relation to the nature of the incoming liquid/solid mix and its rate of passage.

The top of the filter unit 10 may be open, or closed with appropriate provision for venting the reservoir 26 and vertically extending chamber 20.

Figure 2A:
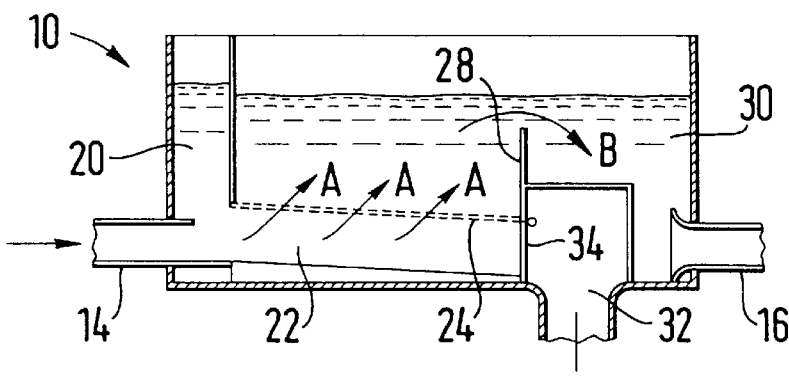
FIGS. 2a–2d show similar schematic views of the filtration unit of FIG. 1 during various stages of its operation.

The operation of the filtration unit will now be described with reference to FIGS. 2a to 2d. In FIG. 2a, the flap valve 34 is in its normally closed position. Fluid entering the unit 10 at inlet 14 fills lower chamber 22 and passes through screening element 24 to fill reservoir 26 with screened fluid (as depicted by arrows A) until reaching the level of the top edge of weir plate 28. Whilst there is little or no pressure differential across screening element 24, the fluid will fill vertically extending chamber 20 to approximately the same level as found in reservoir 26. Once the reservoir is full, screened fluid will be output over the weir plate 28, as shown by arrow B, through first output chamber 30 and first outlet 16.

Figure 2B:
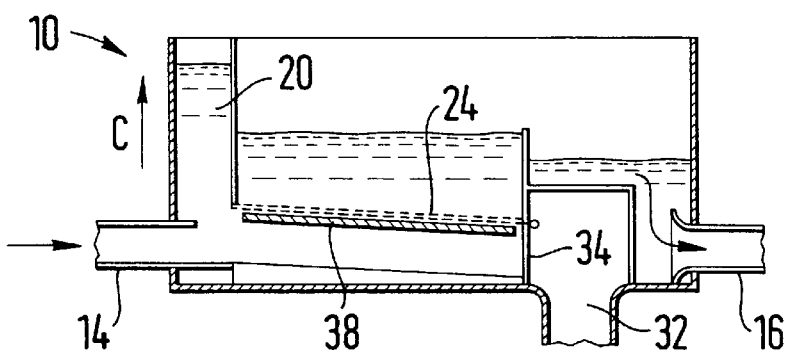
Figure 2C:
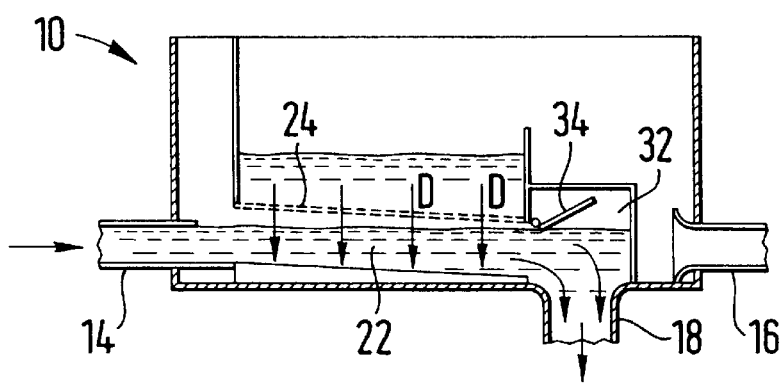

After a period of operation, screening element 24 becomes blocked or "blinded" with solid material 38 as shown in FIG. 2b. The blinding of the screen causes an increase in pressure on its upstream side causing the fluid level In vertically Extending chamber 20 to rise (arrow C).

Once this pressure has risen to a certain level, causing the fluid level in vertically extending chamber 20 to reach a predetermined height, a float device 40 located in vertically extending chamber 20 causes the flap valve 34 to open rapidly (FIG. 2c), as described hereinafter.

Second output chamber 32, located behind the flap valve 34, is at a substantially lower pressure than the lower chamber 22, either by virtue of it being an empty containment at atmospheric pressure, or at negative pressure by the action of a suction pump or other means. This lower pressure causes a rapid discharge of filtered fluid through the screening element 24 causing a drop in the level of the head of fluid built up above the screening element 24 (arrows D). By suitable sizing of the flap valve 34 and second outlet 18 compared with the inlet 14, the discharge flow through second outlet 18 will be considerably greater than the incoming flow, and the reverse of back-flushing flow through screening element 24 dislodges solid material from the screening element and flushes it away with the discharge flow.

The discharge flow, including accumulated solid material screenings can be discharged to a suitable outlet or collection vessel for further processing.

Figure 2D:
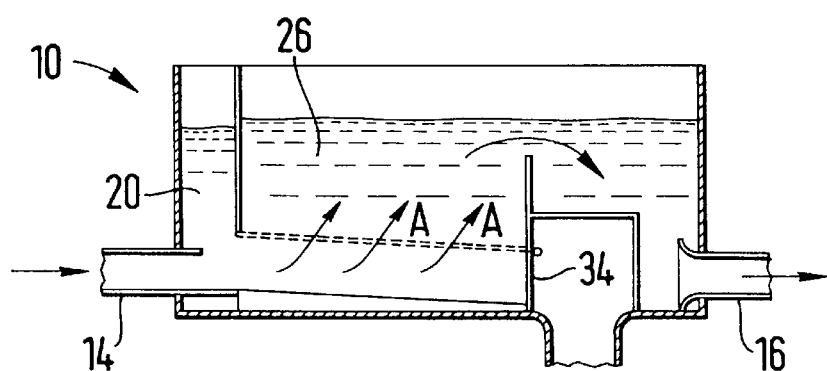

Once the discharge flow has emptied the reservoir 26 and vertically extending chamber 20, the float device 40 will return to a lower level enabling closure of the flap valve. The flap valve may be adapted to remain open until the reservoir 26 has emptied, or for a predetermined period thereafter, allowing further side flushing of the screen by fluid arriving from inlet 14. Once the flap valve 34 has closed, the filter unit returns to normal steady state operation as shown in FIG. 2d.

Figure 3:
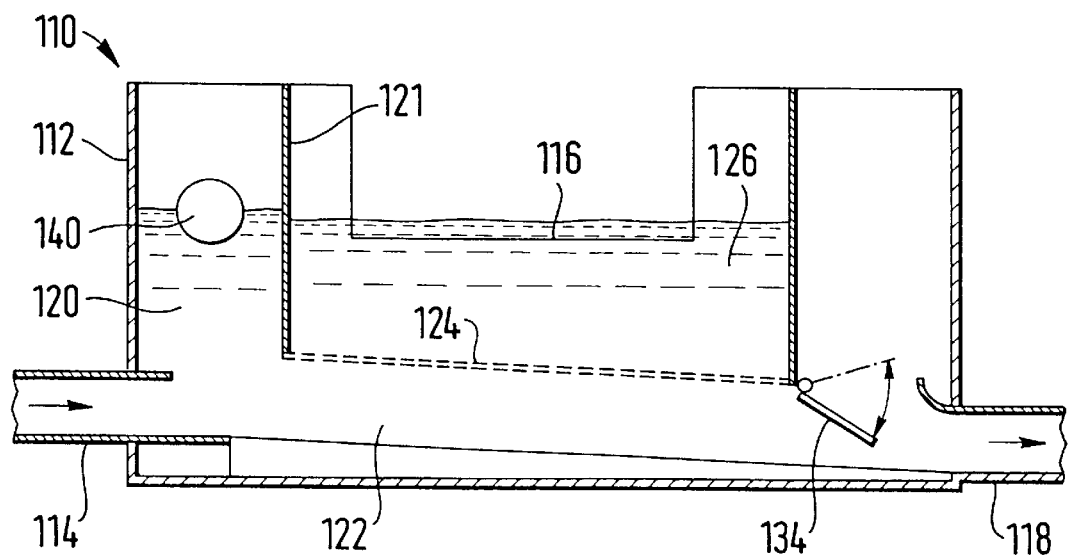
FIG. 3 shows a schematic view of a longitudinal section of an overflow filtration unit according to the present invention.

With reference now to FIG. 3, a further embodiment of the invention is shown in the form of an overflow filter unit, 110. This overflow filter is adapted to operate in a similar manner to that of the filtration unit described above, but is only required to filter excess or overflow fluids such as those commonly found during storm, heavy rain or flood conditions.

In FIG. 3 there is shown a side view of a longitudinal cross section of an overflow filtration unit 110. The unit comprises a housing 112 which provides an inlet 114, a first outlet 116, and a second outlet 118. Inlet 114 enables access of fluid to a vertically extending chamber 120 and a bypass chamber 122. A screening element 124, which is preferably lies on a horizontal or slightly inclined plane as shown, separates the bypass chamber 122 from a reservoir 126. Reservoir 126 is separated from the vertically extending chamber 120 above the level of screening element 124 by chamber wall 121. Fluid in vertically extending chamber 120 and reservoir 126 may therefore find different levels depending upon a pressure differential formed across screening element 124. The first outlet 116 comprises a weir plate on at least one edge of reservoir 126 over which fluid from reservoir 126 may flow. Alternatively, this weir plate may be an outlet pipe situated in the reservoir wall at a predetermined height above the screening element 124.

The second outlet 118 is provided on the downstream side of a valve 134, which is preferably a flap-type valve.

Figure 4A:
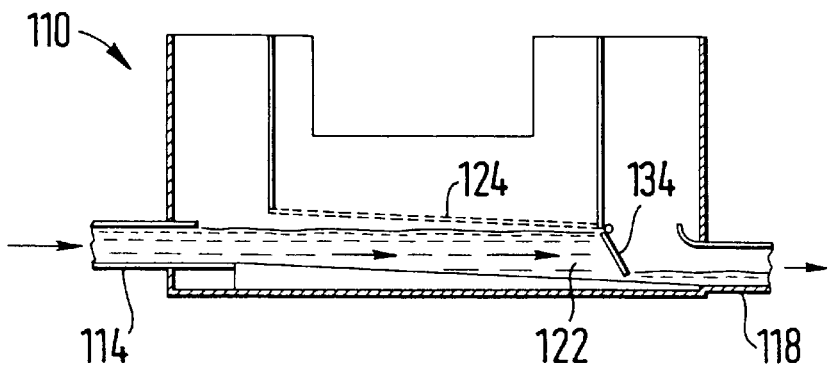
FIGS. 4a–4d show similar schematic views of the overflow filtration unit of FIG. 3 during various stages of its operation.
Figure 4B:
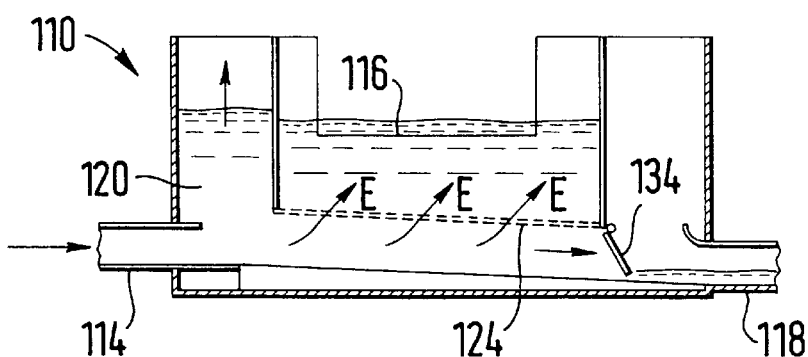

The operation cf the overflow filter unit 110 will now be described with reference to FIGS. 4a to 4d. In FIG. 4a, the flap valve 134 is in its normal partially opened position. The position of the valve is predetermined to allow a suitable flow rate through the bypass chamber 122 such that fluid entering the unit 110 at inlet 114 flows straight through bypass chamber 122 without impinging on screening element 124. In this normal, quiescent flow condition the reservoir 126 and pressure sensing chamber 120 remain substantially empty, and inlet fluid passes straight through the unit unfiltered to the second outlet 118.

Under the conditions of high flow (FIG. 4b), additional filtering capacity is required, and the filter unit 110 commences operation. Excess fluid which cannot exit through the second outlet 188 passes through the screening element 124 (arrows E) to fill reservoir 126 with screened fluid until reaching the level of the first outlet 116, whereupon this screened fluid exits the filter unit. In similar manner to input filtration unit 10, whilst there is little or no pressure differential across screening element 24, the fluid will fill vertically extending chamber 120 to approximately the same level as found in reservoir 126.

Figure 4C:
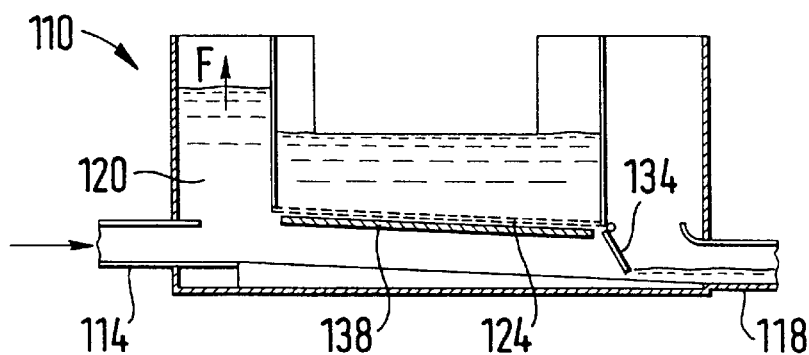
Figure 4D:
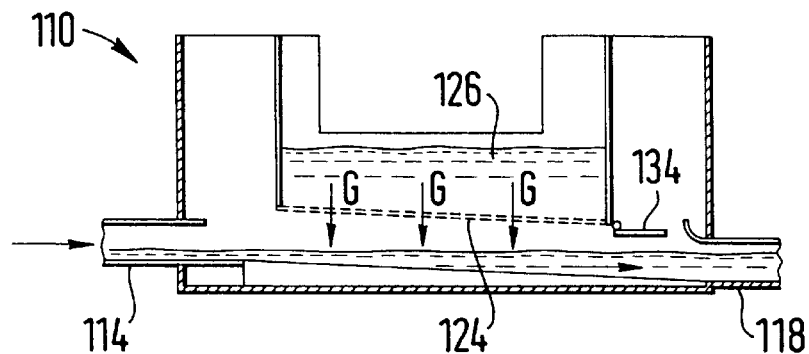

After a period of overflow operation, screening element 124 becomes "blinded" with solid material 138 as shown in FIG. 4c. The blinding of the screen causes an increase in pressure on its upstream side causing the fluid level in vertically extending chamber 120 to rise still further than the reservoir level (arrow F). Once this pressure has risen to a certain level, causing the fluid level in vertically extending chamber 120 to reach a predetermined height, a float device 140 located in vertically extending chamber 120 causes the flap valve 134 to rapidly open to a fully open position (FIG. 4d), as described hereinafter.

Since the full opening of this flap valve 134 now allows a flow of fluid to the second outlet 118 far greater than the incoming fluid flow, a discharge flow (arrows G) from the reservoir 126 back-flushes the screening element 124 hence cleansing it of deposited screenings.

Once the discharge flow has emptied the reservoir 126 and vertically extending chamber 120, the float device 140 will return to a lower level enabling return of the flap valve to its former, partially open position as in FIG. 4a.

Construction materials for the filter units of the present invention are well known in the art and will be selected to ensure that, for the particular solid-liquid mix anticipated, the materials will be non-corrosive and non-reactive.

Figure 5:
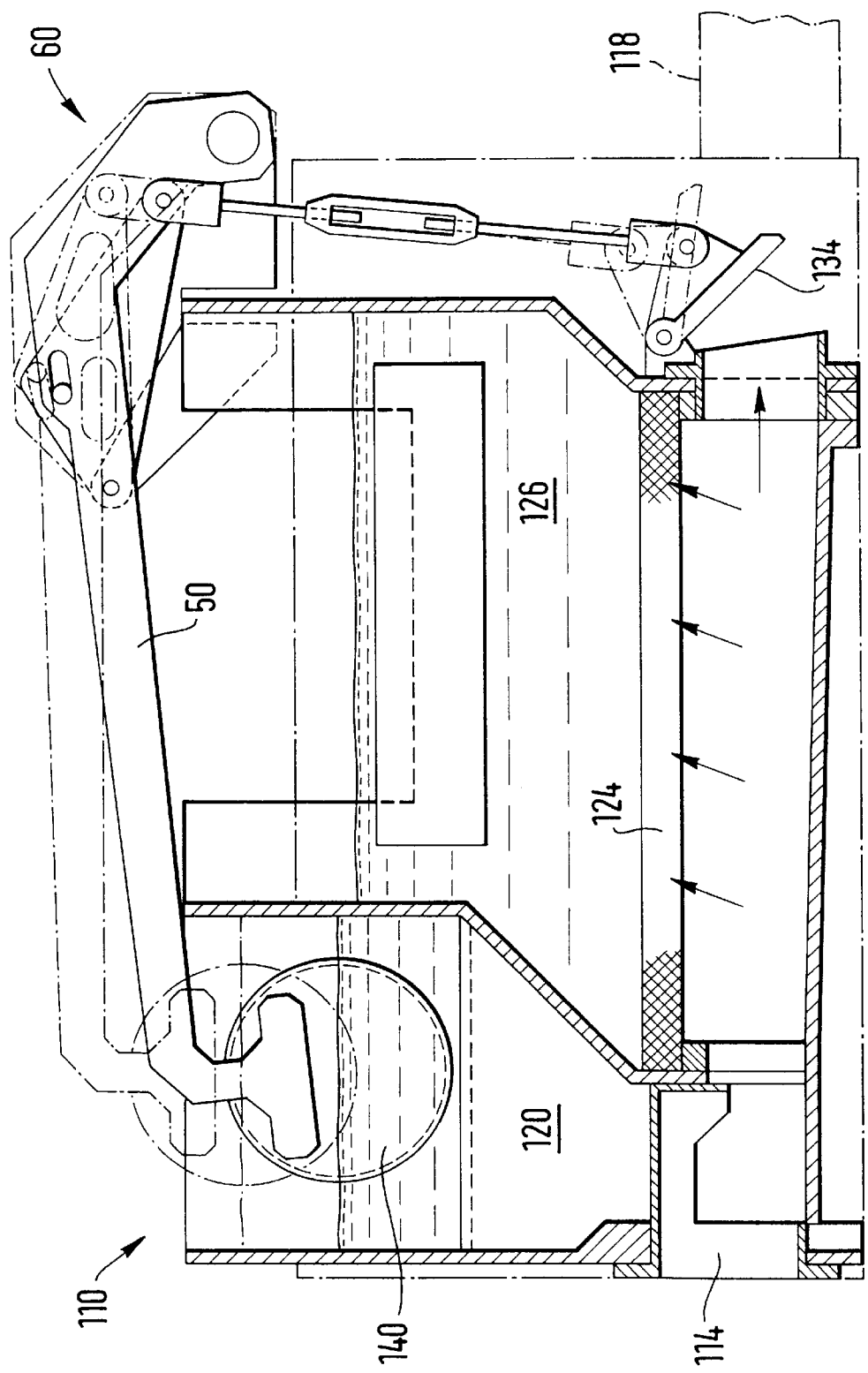
FIG. 5 shows the overflow filtration unit of FIG. 3 with a lost-motion cam arrangement for regulating fluid flow through the unit.

It will be understood that the mechanism used to actuate the valves 34, 134 which is responsive to the fluid level in pressure sensing chambers 20, 120 may be in accordance with any one of a number of techniques. In preferred embodiments, the float device 40 in vertically extending chamber 20, 120 is linked by an arm 50 to a suitable release mechanism which ensures that opening of the valve occurs rapidly to ensure maximum back-flow rate through the screening element 24, 124. Re-closure of the valve may be actuated more slowly following the fall of the float device. The embodiment illustrated in FIG. 5 uses a lost-motion cam arrangement 60 to link the float device 40 with the flap valve 134. The phantom lines in FIG. 5 illustrate the position adopted by the float, the arm and the lost-motion cam arrangement when the flap valve 134 is fully open.

Figure 6:
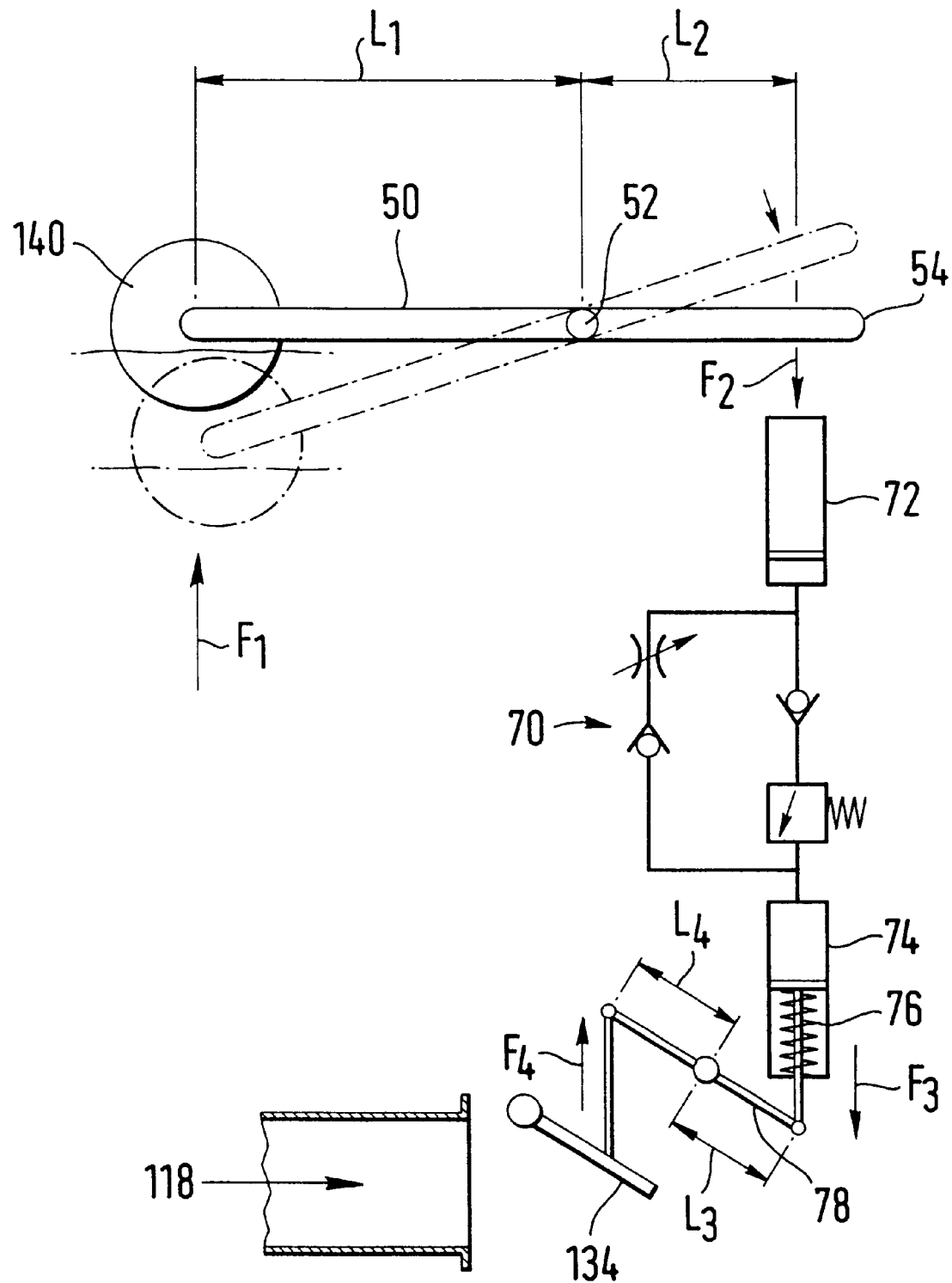
FIG. 6 shows schematically a hydraulic arrangement for regulating fluid flow through a filtration unit according to the present invention.

FIG. 6 illustrates another way in which the flap valve 134 may be controlled using the float device 140 and arm 50. As the fluid level rises, the buoyancy of the float device 140 creates an upward force $F_1$ which causes the arm 50 to pivot about point 5, generating a downward force $F_2$. The end 54 of the arm furthest from the float device is coupled to a hydraulic arrangement 70, including two cylinders 72, 74. Force $F_2$ drives hydraulic fluid from cylinder 72, causing the piston in cylinder 74 to compress a spring 76 and operate a lever 78. Movement of the lever 78 in a clockwise direction opens the flap valve 134. When the float device 140 drops to a lower level, the forces $F_1$ and $F_2$ are reversed and hydraulic fluid flows from cylinder 74 to cylinder 72 with the help of the bias provided by spring 76. The resulting movement of the piston in cylinder 74 rotates the level counter-clockwise and closes the flap valve 134. Other ways of operating the flap valve 134 include a non-electrically powered hydraulic master-slave piston arrangement or a stored energy system eg. either a pneumatic, compressed air driven system, or electrical system.

The float device 140 and the vertically extending chamber 20, 120 could be replaced with any one of a number of available pressure sensing transducers, for example mounted in the lower chamber 22 or bypass chamber 122. Alternatively, the float device 40,140 could be replaced with a capacitive, ultrasonic or other type of level sensor within pressure sensing chamber 20, 120.

It will be understood that the flap valve could be operated using a completely electromechanical control system, albeit possibly reducing some of the advantages of the present invention in respect of immunity to electrical power loss.

INDUSTRIAL APPLICABILITY

It will also be understood that although the preferred embodiments herein described pertain to filtration units used in the treatment of sewage, the present invention is readily applicable to filtration units in other applications. In addition, it will be appreciated that filtration units according to the invention can be situated above or below ground and housed in concrete containments.

What is claimed is:

1. Screening apparatus for a rainwater and sewage system, comprising an inlet, a first outlet, a screening element disposed between the inlet and the first outlet for screening sewage from liquid flowing from the inlet to the first outlet, a reservoir for accumulating a head of screened liquid between the screening element and the first outlet, and means for reversing liquid flow to pass the head of screened liquid through the screening element to remove accumulated screenings from an inlet side of the sewage screening element, wherein the means reversing liquid flow comprises a second outlet a valve for regulating liquid flow through the second outlet, and means, responsive to a change in pressure of liquid on the inlet side of the screening element, for controlling the valve, the second outlet being disposed on the inlet side of the screening element and having a flow capacity greater than that of the inlet whereby liquid received through the inlet during backflushing is carried with screened filtered liquid and screenings through the second outlet.

2. A method of cleaning solids from a screening element disposed between an inlet and an outlet in a liquid/solid separator for a rainwater and sewage system, said method comprising the steps of:

screening solids from liquid flowing from the inlet to the outlet;

storing a head of screened liquid on an outlet side of the screening element; and monitoring liquid pressure on the inlet side of the screening element;

reversing liquid flow to backflush the head of screened liquid through the screening element from the outlet side to an inlet side of the screening element, wherein liquid flow is reversed by regulating liquid flow through an additional outlet in dependence on liquid pressure monitored, the additional outlet being disposed on the inlet side of the screening element and having a flow capacity greater than that of the inlet whereby liquid received through the inlet during backflushing is carried with screened liquid and solids through the additional outlet.

3. A method according to claim 2, in which the monitoring liquid pressure step includes providing a chamber in fluid communication with the inlet, in which liquid level in the chamber is dependent on liquid pressure, and determining liquid level in the chamber.

4. Screening apparatus according to claim 1, in which the controlling means includes a chamber in fluid communication with the inlet, with liquid level in the chamber being indicative of the pressure of liquid on the inlet side of the screening element.

5. Screening apparatus according to claim 4, in which the controlling means further includes a float disposed in the chamber, the float having a position in the chamber dependent on a level of liquid therein.

6. Screening apparatus according to claim 5, in which the float has a buoyancy for actuating the valve when liquid pressure on the inlet side of the screening element exceeds a predetermined level.

7. Screening apparatus according to claim 5, further comprising a lever coupled to the float, wherein movement of the float in the chamber causes the lever to pivot and actuate the valve.

8. Screening apparatus according to claim 4, in which the controlling means further includes means for detecting a level of liquid in the chamber.

9. Screening apparatus according to claim 8, in which the detecting means comprises a pressure-sensing transducer.

10. Screening apparatus according to claim 1, in which the controlling means includes one of a hydraulic and a pneumatic system.

11. A sewage treatment apparatus comprising screening apparatus comprising an inlet, a first outlet, a sewage screening element disposed between the inlet and the first outlet for screening sewage from liquid flowing from the inlet to the first outlet, a reservoir for accumulating a head of screened liquid between the sewage screening element and the first outlet, and means for reversing liquid flow to pass the accumulated head of screened liquid through the sewage screening element to remove accumulated screenings from an inlet side of the sewage screening element wherein the means reversing liquid flow comprises a second outlet, a valve for regulating liquid flow through the second outlet and means, responsive to a change in pressure of liquid on the inlet side of the screening element for controlling the valve, the second outlet being disposed on the inlet side of the sewage screening element and having a flow capacity greater than that of the inlet whereby liquid received through the inlet during backflushing is carried with filtered liquid and screenings through the second outlet.

12. Screening apparatus according to claim 1, in which the reservoir is located above the screening element.

13. Screening apparatus according to claim 1, in which the reservoir has a capacity set by a weir.

14. Screening apparatus according to claim 1, in which the valve substantially prevents liquid flowing through the second outlet when liquid pressure on the inlet side of the screening element is at or below a predetermined level.

15. Screening apparatus according to claim 1, in which the valve allows a first rate of liquid flow through the second outlet when liquid pressure on the inlet side of the screening element is at or below a predetermined level and a second rate of liquid flow when liquid pressure is greater than the predetermined level, the second rate being greater than the first rate.

* * * * *